(12) United States Patent
Ross et al.

(10) Patent No.: US 10,035,406 B2
(45) Date of Patent: Jul. 31, 2018

(54) LIQUID CONTAINING DRILL CUTTINGS TRANSPORT VESSEL

(71) Applicant: RECOVER ENERGY SERVICES INC., Calgary (CA)

(72) Inventors: Stan Ross, Cochrane (CA); Gregory Steger, Calgary (CA)

(73) Assignee: RECOVER ENERGY SERVICES INC., Calgary, Alberta (CA)

( * ) Notice: Subject to any disclaimer, the term of this patent is extended or adjusted under 35 U.S.C. 154(b) by 168 days.

(21) Appl. No.: 15/014,451

(22) Filed: Feb. 3, 2016

(65) Prior Publication Data
US 2016/0250960 A1 Sep. 1, 2016

Related U.S. Application Data (60) Provisional application No. 62/120,542, filed on Feb. 25, 2015.

(51) Int. Cl.
| | |
|---|---|
| *B65D 88/02* | (2006.01) |
| *B60P 3/22* | (2006.01) |
| *B65D 90/02* | (2006.01) |
| *B65G 67/24* | (2006.01) |
| *B60J 7/00* | (2006.01) |
| *B65D 88/12* | (2006.01) |
| *B65D 90/00* | (2006.01) |

(52) U.S. Cl.
CPC .............. *B60J 7/00* (2013.01); *B65D 88/126* (2013.01); *B65D 90/00* (2013.01)

(58) Field of Classification Search
CPC ...... B65D 88/56; B65D 25/22; B65D 88/022; B65D 88/123; B65D 88/58; B65D 88/60; B65D 90/008

USPC .......... 298/8 R, 18, 22 R, 8 T, 7, 17.6, 23 B, 298/23 C, 29, 25, 27, 17.7; 410/52, 77, 410/134, 153, 2, 31, 51, 90; 414/470, 414/24.5, 517, 510, 500, 812, 421
See application file for complete search history.

(56) References Cited

U.S. PATENT DOCUMENTS

| | | | | |
|---|---|---|---|---|
| 3,331,433 A | * | 7/1967 | Hagberg | B60H 1/00014 165/51 |
| 3,449,678 A | * | 6/1969 | Wade | H01J 25/49 315/3 |
| 4,476,788 A | * | 10/1984 | Loevinger | B65D 88/744 105/358 |
| 4,775,070 A | * | 10/1988 | Williams | B60P 3/24 105/358 |
| 7,320,504 B2 | * | 1/2008 | Colling | B60P 1/286 298/1 H |
| 2014/0353308 A1 | * | 12/2014 | MacLean | B60P 3/2235 220/1.5 |

* cited by examiner

*Primary Examiner* — D Glenn Dayoan
*Assistant Examiner* — Sunsurraye Westbrook
(74) *Attorney, Agent, or Firm* — Greenblum & Bernstein, P.L.C.

(57) ABSTRACT

A transport vessel and method specifically adapted for safely transporting liquid containing unstabilized drill cuttings. Typically drilling waste is stabilized using binding agents like fly-ash, liquids absorbing pellets or sawdust. In many jurisdictions binding agents are required to stabilize the drilling waste prior to transport. A sealed transport vessel is described herein which is specifically sized and positioned over a set of axels so as to provide for safe, non-spilling transport.

16 Claims, 3 Drawing Sheets

LIQUID CONTAINING DRILL CUTTINGS TRANSPORT VESSEL

CROSS-REFERENCE TO RELATED APPLICATION

The present application claims the benefit under 35 U.S.C. § 119(e) of U.S. Provisional Application No. 62/120,542 filed Feb. 25, 2015, the disclosure of which is expressly incorporated by reference herein in its entirety.

TECHNICAL FIELD

The field of art to which this invention generally pertains is the transport and processing of drill cuttings.

BACKGROUND

During the drilling of a well, gas or oil for example, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil based or brine based drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

It is not an uncommon job site practice to throw refuse, for example drilling mud bags, spent plastic sheets or broken pallets into the onsite drill cuttings storage bin. This practice has not been seen as problematic because the drilling waste was destined for a landfill.

With the evolution of new technologies and the increasing cost of drilling fluids, the ability to, and benefits of, reclaiming the lost drilling fluids is increasing. However, technologies such as thermal extraction, solvent washes, or alternate mechanical separators work less effectively, if at all, with bulking agents or refuse mixed with the drilling waste, prior to shipping.

Typically, stabilized drill cuttings are loaded into open top, sealed end dumps and then moved to a secure waste landfill. A sealed end dump is a large open trailer which allows the material to be moved by loader or excavator into the trailer, while the sealed nature of the end dumping gate ensures any transient liquids that are able to leach from the stabilized drill cuttings, remains in the trailer during transport. A tarp or net is moved over the load to ensure that a minimum amount of moving air is in contact with the stabilized drilling waste, including the refuse when present, preventing it from becoming airborne and leaving the trailer.

This has proven to be a convenient and economical way to transport stabilized drill cuttings. However, the use of this type of transport vessel, which has become an industry standard for transporting drilling waste, is not a practical way to transport unstabilized drilling waste, especially because of potential safety issues. For example, if bad road conditions, driver error, or other adverse circumstances, contribute to an accident, or cause trailer over-turning, the load could easily flow out of the transport vessel onto the ground or otherwise end up in a water-way. The flammable or toxic nature of the oil base or brine base drilling mud contaminating the drill cuttings could cause significant environmental damage or even loss of life.

Thus, the need to transport unstabilized drill cuttings in a safe, efficient manor to recycling or remediation facilities has arisen.

BRIEF SUMMARY

A transport vessel specifically adapted for transporting liquid containing unstabilized drill cuttings is described including a substantially rectangular shaped container body capable of holding liquid containing unstabilized drill cuttings, the body having a bottom section, connecting two side sections, a front section, and a liquid sealing end section, the body section being covered with a liquid sealing lid section, the liquid sealing end section and the liquid sealing lid section being removably attached to the rectangular body so as to permit filling and emptying of the vessel with liquid containing unstabilized drill cuttings, where the transport vessel provides stable transport of liquid containing unstabilized drill cuttings absent leakage, loss or spillage of liquid from the vessel in transport or when the vessel is in a position other than horizontal.

Additional embodiments include: the vessel described above having an internal volume of up to about 11 cubic meters; the vessel described above having at least two axels attached to the bottom section and supporting the substantially rectangular body; the vessel described above configured to contain about 2 to about 4 cubic meters per axel; the vessel described above including 2 axels; the vessel described above including 3 axels; the vessel described above where the container body is removably attached to the axels through rails which allow the container body to slide or roll off the rails when desired after transport; the vessel described above additionally containing a mesh covering positioned inside of the transport vessel at a point just below the liquid sealing lid section; the vessel described above where the mesh section has openings from about 5 centimeters to about 20 centimeters so as to permit the liquid containing unstabilized drill cuttings to freely pass through the mesh section while retaining refuse or debris on the surface of the mesh section; the vessel described above additionally containing a drip guard attached to at least one side section so as to prevent drips or spills of unstabilized drill cuttings during the loading process; the vessel described above capable of holding up to about 20,000 kgs (kilograms) of liquid containing unstabilized drill cuttings; the vessel described above where the liquid containing unstabilized drill cuttings are oil based mud drill cuttings or water containing salt based drill cuttings; the vessel described above where the axels are positioned so as to provide a substantially equal weight distribution of liquid containing unstabilized drill cuttings on each axel during transport; the vessel described above including multiple vessels connected in series.

A method of transporting liquid containing unstabilized drill cuttings is also described, including filling the vessel described above with liquid containing unstabilized drill cuttings, transporting the filled vessel to a pre-determined dumping location, and unloading the liquid containing unstabilized drill cuttings from the vessel, without any leakage of liquid from the drill cuttings during transport.

Additional embodiments include: the method described above including filling multiple vessels and transporting them in series; the method described above where the cuttings contain about 20% to about 50% liquids by volume; the method described above where the weight of the cuttings is about 10,000 kilograms to about 20,000 kilograms per transport vessel; the method described above where the unstabilized drill cuttings are oil based mud drill cuttings or water containing salt based drill cuttings.

These, and additional embodiments, will be apparent from the following descriptions.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

As mentioned above, without stabilization material, the otherwise wet drill cuttings can readily leach free liquids, which is obviously an unacceptable waste behavior both during transport and at any landfill. The cuttings also typically move and behave like a liquid, for example within the transport vessel, due to the high amounts of oil, water or other liquid on the drill cuttings. On a volumetric basis, the cuttings can contain, between about 20% and about 50% liquid.

Because of these and other issues, various transport methods for transporting unstabilized drill cuttings have been attempted. One example is a vacuum truck which can self-load unstabilized drill cuttings using negative air pressure until the transport vessel is adequately filled and a maximum legal amount of weight is exhibited per axel. The load is self-contained and can be considered safe for transport. If something should happen to the transport vessel, the vessel is designed so that a minimum to no unstabilized drilling waste comes in contact with the environment. On the downside, the loading process for this type of vessel is very slow, and of course the use of such things as conventional excavators or loaders would be precluded.

Another example is transport vessels specifically designed to transport and unload viscous materials. These vessels include vibration devices and optionally heat, such as hot air, to reduce the surface tension the waste may have on the transport vessel (also referred to as a container, container body or box). Vibration is used to remove the viscous or sticky materials. While vibration may help in removing drilling waste from a vessel, hot air would have little to no effect on removing unstabilized drilling waste. The hot air would simply the top surface of the drilling waste, and not the bottom section, which is where the drilling waste would adhere to the surface of the transport vessel.

Another example is a rectangular cube having a sealed end gate and sealed lid/roof section, all of which are mounted on a loadable skid. The cube allows the lid to be lifted so that jobsite equipment such as a loader or back hoe can load the vessel. The lid and end gate are intended to minimize the unstabilized drilling waste coming into contact with the environment. However, this type of transport vessel is very heavy, adversely impacting the amount of cargo weight that can be moved on each trip. Also, only specialized trucks equipped with a lifting device can move the transport vessel.

Another example is a transport vessel which consists of a sealed end dump trailer with a sealed lid/roof section. The vessel can include the use of an interconnected baffle system which is connected to the end gate. When the end gale is locked, the baffles are also locked which would prohibit movement of unstabilized drilling waste, for example, which would have a tendency to move from one set of axels to another when the truck is traveling up or down a hill. However, a transport vessel capable of handling the weight involved with such a baffle system, in addition to a reasonable amount of unstabilized drilling waste, would have to be unreasonably large when compared to the volume of unstabilized drilling waste which could actually be hauled on legally weighted axels. See, for example, U.S. Published Patent Application No. 2014/0353308, the disclosure of which is herein incorporated by reference.

As described herein, these problems and others in this area are addressed through the use of one or more smaller transport vessels which are built like that of a substantially rectangular cube, including a sealed end gate and sealed lid/roof section. The size of the transport vessel allows a limited amount of unstabilized drilling waste to be loaded into each individual transport vessel, which helps control the weight exhibited by the transport vessel and cargo within, e.g., so as not to exceed the legal axel loading permitted on roadways or other transportation corridors. For example, a single transport vessel could measure about 15 feet long, about 3.5 feet high, and about 7 feet wide so that it is nearly the same length as the tri-axels that sit under the vessel.

Volumetrically, this vessel could hold up to approximately 11 cubic meters of material. A driver would be responsible for loading the vessel until such time that the axels are carrying a legal/recommended/desired amount of weight. This smaller transport vessel would weigh less than traditional larger end dumps and thus, be capable of hauling larger amounts of unstabilized drilling waste cargo on each trip. The design of the trailer transport vessel could be the same as the truck mounted transport vessel.

A typical transport vessel as described herein would be designed to hold about 11 cubic meters, which is about 390 cubic feet of volume. Tri-axels are typically about 13 feet long so the vessel should desirably extend about one foot past the axels (on each end) which result in a vessel about 15 feet in length. The width of the vessel would be designed to be about 7 feet wide (inside width) and about 3.5 feet in height (inside height). This would result in a total volume of about 390 cubic feet, about 10 cubic meters of volume, including about eight inches of space from the normal load line to the inside of the lid that seals the transport vessel closed (with every four inches of depth in the vessel equal to about 1 cubic meter of volume).

The vessel described herein is configured to contain approximately 2 to 4 cubic meters per axel, to help accomplish the objectives described herein. A two axel vessel can carry approximately 17,000 kgs and a three axel vessel can carry approximately 23,000 kgs. If the transport vessel and wheels weigh approximately 8,000 kgs to 15,000 kgs, and each cubic meter of drill cuttings weigh approximately 2000 kgs, then the vessel can carry a net weight of approximately 10,000 kgs on a two axel vessel and approximately 20,000 kgs on a tri-axel vessel (e.g., 10,000/2 axels=5,000 kgs=2.5 cubic meters/axel and 20,000/3 axels=6,600 kgs=3.3 cubic meters/axel). Where applicable, measures do not include the steering axel of the truck body. Measures for trailers include all axels because there is not a steering axel on trailers.

As described above, and shown in the Figures, the container is sized so as to substantially equally distribute the weight of the cuttings over each axel, eliminating the need for baffles, or other adjustments, to provide for stable transport of the cuttings. This, coupled with the sealed end gate and cover, provides for spill free, stable transport, even if the trailer were to overturn. More importantly, the smaller nature of each box would allow more weight to be packed on each trip and the cuttings would not be able to move off of one set of axels, putting additional weight on another set of axels. Based on the control of the size of the vessel as described herein, the cuttings are restricted from moving around in the vessel and causing the weight to shift.

Figure 1:
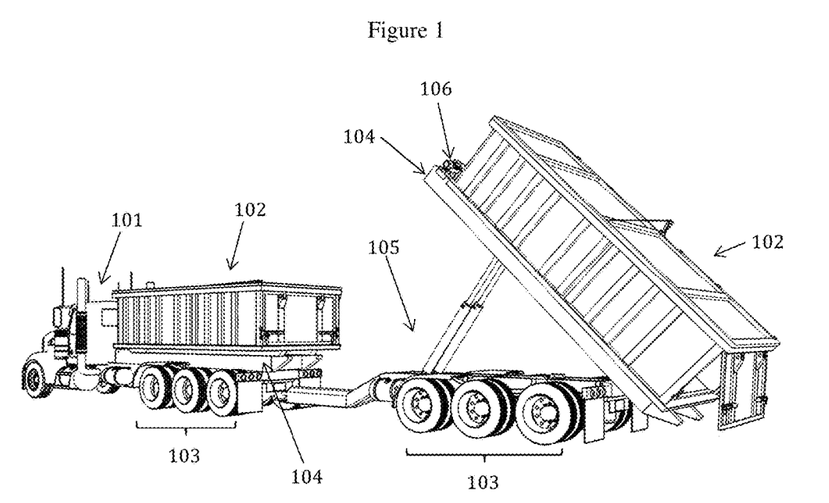
FIG. 1 shows a truck and transport vessel embodiment connected as one complete unit (and trailer version of the same), as described herein useful in methods as described herein.

As demonstrated in FIG. 1, a truck (101) and trailer (105) system is shown equipped with two transport vessels (102) as described herein, being pulled in tandem. The vessels are sized so as to provide content weight equally distributed over each axel (103).

Figure 2:
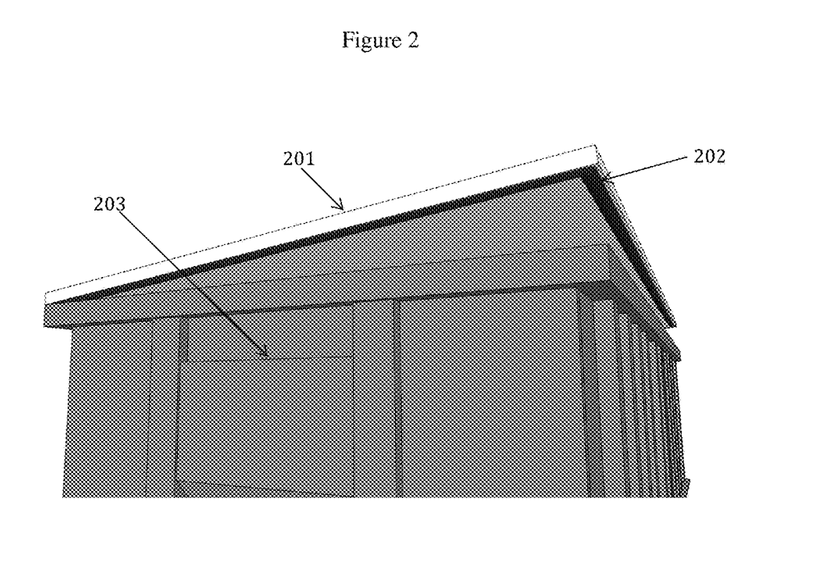
FIG. 2 shows a clam shell lid embodiment of an apparatus as described herein useful in methods as described herein.

As demonstrated primarily in FIG. 2, the sealing clam shell lid (201) of the transport vessel (102/301) has a gasket section (202) and when the lid is in the closed position, the gasket section is compressed against the rim/sealing section (403) of the lower body (203) of the transport vessel, forming a liquid tight seal to ensure the unstabilized drill cuttings cannot escape from the transportation vessel when the lid section is secured to the body section with latches (not shown) for transport. It should also be noted, that while the lid is shown, for example, in FIGS. 2 and 3, as completely covering the container, other design options can also be employed, for example, such as a sectioned lid, wherein part of the lid is permanently or non-removably attached to the container, and part of the lid is removably attached to the container, i.e., part of the lid can be raised and lowered to fill and empty the container, while the other part of the lid remains stationary during the process—as long as such combined lid sections achieve the desired sealing objectives.

Figure 3:
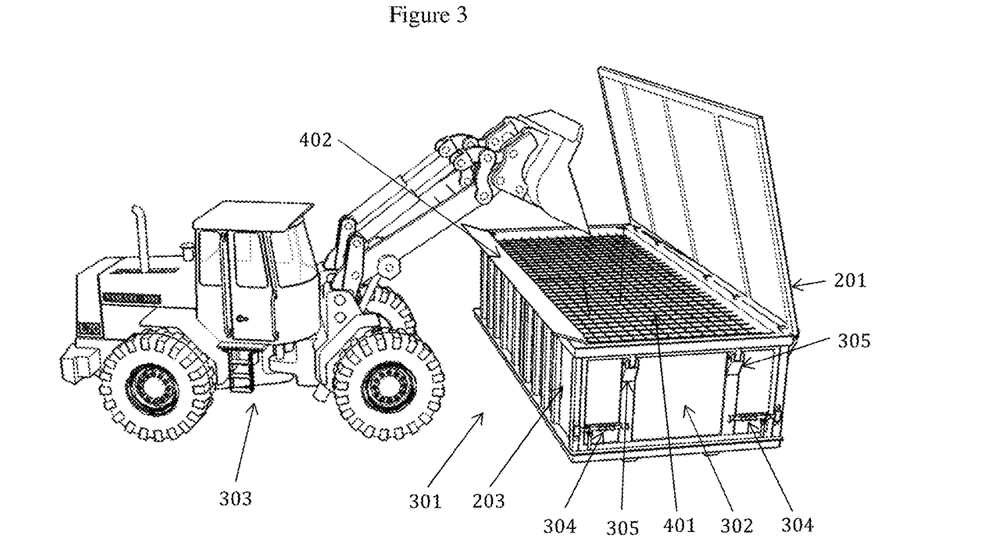
FIG. 3 shows a representative embodiment of a transport vessel as described herein being loaded at a jobsite.
Figure 5:
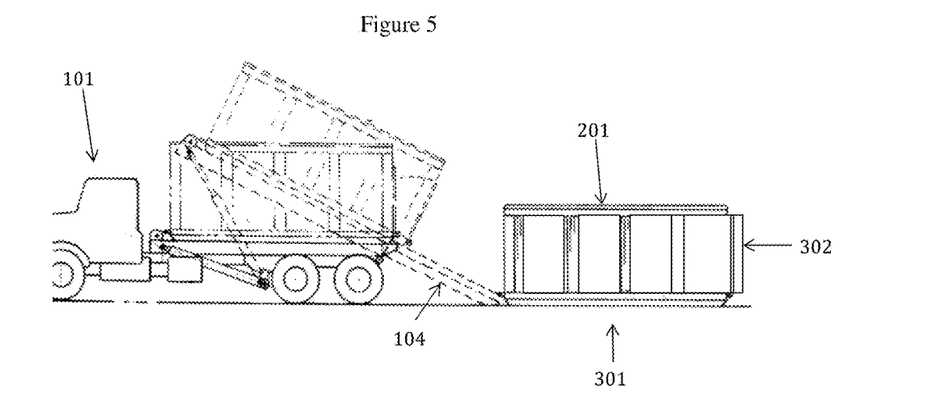
FIG. 5 shows an illustration of a removably attached embodiment being unloaded, as described herein.

Another option is shown primarily in FIG. 3, for potential users of the method and apparatus described herein, who might prefer not to fill the already axel mounted transport vessel (i.e., "front end loader")—for example, for those that may not have an excavator on site, or for other reasons. For such users or job-sites another option would be to use a roll-off bin (301) that has a sealable lid (201) and sealable end gate (302), which can be left on site to be loaded as the cuttings are generated. When ready for pick-up, the lid section (201) can be lowered and secured to the lower body section (203), specifically the gasket section (202) comes in direct contact with the lower body sealing surface (403), picked up, and an empty bin ready for filling left behind. The bins can be simply exchanged using a conventional skid and rail system (104) and winch system (106), and transport truck (101) and/or trailer (105). See also FIG. 5.

Figure 4:
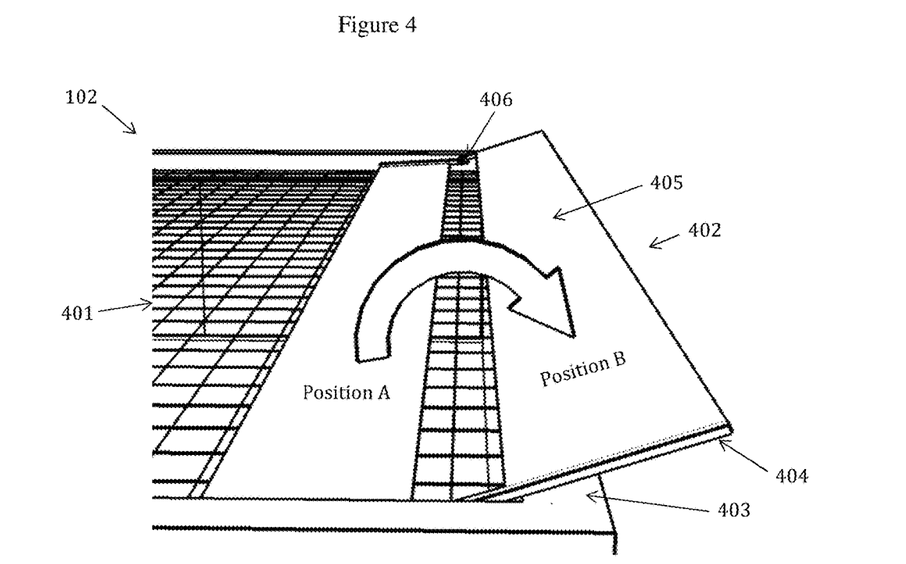
FIG. 4 shows a representative embodiment of a mesh covering and drip guard as described herein.

Another embodiment of the roll-off transport vessel (301) is demonstrated in FIG. 4 wherein a mesh cover (401) is built along the inside, at or near the top of the wall sections. The mesh cover would be removably attached and ideally have openings large enough to allow the fluidic or granular drill cuttings to freely fall through the openings while prohibiting debris or refuse which was thrown into the onsite drill cuttings storage tanks, (due to poor job site etiquette) from entering the transport vessel. For example, on some job sites, it has been perceived as acceptable to toss empty drilling mud bags, or spent plastic sheets, hydrocarbon absorbent rags, or wood pieces (such as broken pallets), simply because the drilling waste is "landfill bound" anyway and it's easier than taking the debris to a proper refuse container, which is sent to a municipal landfill for proper disposition and recycling initiatives.

The mesh covering (401) would be used to act as a sieve to remove refuse or debris while the onsite loader (303) or excavator is loading the transport vessel (301) with unstabilized drilling waste. The mesh cover (401) may also prove beneficial to cause the equipment operator to load the vessel more slowly (to ensure all of the unstabilized drilling waste falls safely through the mesh openings), thereby reducing the possibility of splashing as the unstabilized drill cuttings fall from an elevation of the loader (303) or excavator bucket to the floor of the transport vessel (301).

The mesh openings would ideally be a minimum of 5 cm (centimeters)×5 cm (2"×2"), but generally not greater than 20 cm×20 cm (8"×8") and most typically 10 cm×10 cm (4"×4") to 15 cm×15 cm (6"×6"). The most durable design for a mesh covering would be to utilize a welded steel wire mesh, punched metal or expanded metal with a thickness of approximately 0.635 mm (millimeters) (¼ inch). Such materials are commercially available from metal suppliers.

Another embodiment of the roll-off transport vessel is demonstrated in FIG. 4 wherein a drip guard (402) extends most (if not all) of the way along the vessel wall that is typically utilized when loading the transport vessel. The drip guard is installed above the mesh covering and below the sealed lid section (201) such that when the lid section is closed, the drip guard is completely inside the bin in "Position A". When the lid section is open (to permit loading of the transport vessel), the drip guard is manually pivoted about 160° so that it's extending outward past the wall in "Position B", thereby preventing any drips from the loader or excavator bucket from falling onto:
 a) the top edge of the wall where the lid sealing section contacts the wall section (403);
 b) the side of the bin causing the transport vessel to look untidy and perceived as leaking;
 c) the ground area near the transport vessel, causing additional cleanup by the equipment operator or truck driver.

Any drips that occur as a result of the loader (303) or excavator buckets overhead movement will subsequently fall on the drip guard (402) and either run back into the transport vessel or fall from the drip guard when the guard is pivoted back into the stored position (Position A) and the roll-off bin is in transit back to a drilling waste recycling facility.

Alternatively, the drip guard does not have to be permanently attached to the inside of the transport vessel and moved into its working position by pivoting. Rather, the drip guard could be manually moved from any detached position and held in place using sockets, brackets or magnets along the transport vessel wall (403), provided the lid section is open.

The drip guard frame (404) consists of two or more arms which are pinned (406) inside of the transport vessel. The frame can be built of metal materials for rigidity, but the section which is functionally utilized to catch or redirect drips (405) can be made of lightweight materials such as plastic or tin. The materials of construction, dimensions (length and width) or means of positioning the drip guard prior to use are of less importance. What is important is the position of the drip guard while the transport vessel is being loaded so to prevent unnecessary mess along the vessel wall or spills of liquid containing drill cuttings on the ground, along the side of the transport vessel.

An added benefit of the drip guard (402) is that while the drip guard is in Position B, unstabilized drill cuttings which might otherwise fall from the loader bucket (thereby making a mess of the outside wall of the vessel or on the ground) is that, the upper surface of the wall section (403) that is directly along the loading side of the transport bin is protected. As such, unstabilized drill cuttings are not falling onto the wall section that is in immediate contact with the gasket sealing section (202 and 403) when the lid (201) is moved to a closed position and readied for transport. So again, as stated above, the vessel can include a mesh cover at or near the top of the inner side of the vessel to prohibit refuse from entering the transport vessel while still allowing fluidic or granular solids to flow or fall through the mesh; and the vessel can include a drip-tray which covers the loading side of the transport vessel to reduce or eliminate the possibility of unstabilized drill cuttings spilling down the side of the transport vessel, or onto the ground as a result of the loading process.

Figure 6:
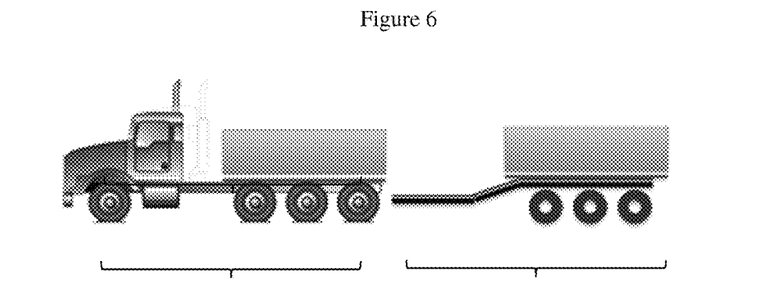
FIG. 6 and FIG. 7 show embodiments of typical transport truck axel configurations (as a truck and pup or truck and wagon respectively) useful in methods as described herein.
Figure 7:
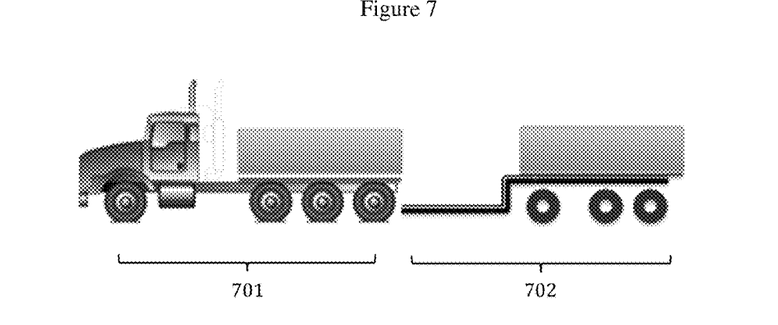

Additional versions of transport vessels in series for use as described herein are shown in FIGS. 6 and 7, showing a version of truck (601 and 701) and trailer (602 and 702). Typical volume and weight distributions for various axel arrangements under the trailer are shown in Tables 1 and 2 below.

TABLE 1

|  | Truck | Trailer (pup) |
| --- | --- | --- |
| Total unit weight | 15000 kgs | 8000 kgs |
| Allowable axel loading | 32000 kgs | 21000 kgs |
| Available cargo | 17000 kgs | 13000 kgs |
| Volume equivalent | 17000/1850 = 9.2 cubes | 13000 kgs/1850 = 7 cubes |
| Meters$^3$ per axel | 2.3 | 2.3 |

TABLE 2

|  | Truck | Trailer (wagon) |
| --- | --- | --- |
| Total unit weight | 15000 kgs | 9000 kgs |
| Allowable axel loading | 32000 kgs | 26000 kgs |
| Available cargo | 17000 kgs | 17000 kgs |
| Volume equivalent | 17000/1850 = 9.2 cubes | 1000 kgs/1850 = 9.2 cubes |
| Meters$^3$ per axel | 2.3 | 3.1 |

On return to the origination point, the transport vessel can be unloaded with a hoe apparatus, or the sealed end gate (302) is unlatched (304) and opened by tipping the transport container, just like a conventional dump truck (as illustrated in FIG. 1). Ideally, the sealed end gate (302) is removably attached to the lower container body (203) by means of heavy duty hinges (305) that are mounted at the top of sealed end gate, which allow the sealed end gate to swing open at the bottom, as illustrated in FIG. 1. Traditionally, end gates on other roll off bins open from the side and the end gate is permitted to pivot about 270° where it locks against the container. However, given the rigidity required to ensure the end gate is sufficiently strong, the weight of the sealed end gate in this design would be dangerous for the operator to unlatch and pivot to the side of the container body. This version of the transport vessel would be constructed to be the same size as the dump truck box (e.g., about 11 cubic meters) and weigh about the same as a regular dump box.

The box size is determined by the maximum allowable weight desired to be carried by each axel, divided by the weight of one cubic meter of wet drill cuttings (for example, approximately 2000 kgs). If each box can carry, for example, 20,000 kgs, divided by 2,000 kgs (per cubic meter of unstabilized drill cuttings), the box could be built with the ability of holding approximately 10 cubic meters, plus an allowance of approximately 10% additional capacity which would be the "free board" inside of the vessel, for a total of 11 cubic meters of total capacity.

It should be noted that the weight of the wet drill cuttings (bulk density) is typically about 1300 kilograms/cubic meter to about to 2400 kilograms/cubic meter, more typically about 1600 kilograms/cubic meter to about 2100 kilograms/cubic meter, and most typically about 1850 kilograms/cubic meter.

The use of brine based (or formates) drill cuttings have become more common more common because they can offer a faster rate-of-penetration when drilling a well. Brine (or salt) based drilling fluids are almost as expensive as oil based mud systems. Some typical oil based muds use distillate or mineral oil as the base hydrocarbon to build the mud. While one would think that brine would be considered much friendlier to the environment than oil, it's actually the opposite. The effects of a spill on the environment can be more serious and last much longer, especially on vegetation. Brines (e.g., mixtures of chlorides and water) allow good hole stability and high penetration rates. They are very hard on seals, pumps, metal tanks, hoses, etc., however. They can also be a cause of a drilled well to stop producing. That being said, they are still a popular form of drill cutting.

The bottom, walls and sealing lid and end gate can all be made of typical transport materials, e.g., metal, steel, etc., used in transport vehicles. The sealing material used around the edges of the sealing lid and end gate are typically sealing plastic or rubber, for example. Any material which prevents or inhibits the leakage of liquid materials can be used. It can be molded, mechanically attached, or glued to the lid and end gate in a thickness and width so as to accomplish the required liquid sealing. While the width or thickness of the rubber material, for example, could match the thickness of the metal lid or end gate, it would not necessarily be so. Again, the point is to attain liquid leakage prevention, so any width and thickness which accomplishes this objective can be used.

The thickness of the walls, sealing lid and end gate can vary, for example, from as little as ¼ inch to ½ inch or less, to as thick as ¾ inch or more. The bottom or floor of the vessel would typically be made of ¼ inch plate steel to prevent the load from damaging the transport vessel (i.e., unlikely to cause wash boarding between the cross members).

Since tri-axels (103) are typically about 13 feet long (about 42 inches per tire with about 11 inches between each tire, the total length from the front of the first tire to the back of the last tire will typically be about 140 inches. The transport vessel (102 or 301) will typically be about one foot past the axels (on each end) which typically result in an overall length of the transport vessel (including front wall and sealing end gate) of about 15 feet, for example. Ideally, the vessel measure about 15 feet by about 3.5 feet by about 7 feet and hold about 390 cubic feet of volume (11 cubes). Volumetrically within the vessel, about every 4 inches of height represents about 1 cube of volume. Thus, if the maximum allowable axel loading permits 9 cubes of unstabilized drill cuttings to be hauled, there will be about 8 inches of free-board before the cuttings spill over the vessel.

The methods and apparatus described herein meet the challenges described above, including, among other things, achieving more efficient and effective drill cutting transport and processing, including prevention, spillage or loss of drill cuttings when the vessel is in a position other than horizontal, e.g., accident, overturn or other upsetting of the transport vessel during transport. Of course during filling and emptying of the vessel, the removably attached lid and end sealing sections would be operated so as to allow filling and emptying.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A transport vessel specifically adapted for transporting liquid containing unstabilized drill cuttings comprising,
   a substantially rectangular shaped container body capable of holding liquid containing unstabilized drill cuttings, the body having a bottom section, connecting two side sections, a front section, and a liquid sealing end section,
   the body section being covered with a liquid sealing lid section,
   the liquid sealing end section and the liquid sealing lid section being removably attached to the rectangular body so as permit filling and emptying of the vessel with liquid containing unstabilized drill cuttings,
   additionally containing a mesh section positioned inside of the transport vessel at a point just below the liquid sealing lid section, wherein the mesh section has openings from about 5 centimeters to about 20 centimeters so as to permit the liquid containing unstabilized drill cuttings to freely pass through the mesh section while retaining refuse or debris on the surface of the mesh section, and
   additionally containing a drip guard attached to at least one side section so as to prevent drips or spills of unstabilized drill cuttings during the loading process,
   wherein the transport vessel provides stable transport of liquid containing unstabilized drill cuttings absent leakage, loss or spillage of liquid from the vessel in transport or when the vessel is in a position other than horizontal.

2. The vessel of claim 1 having an internal volume of up to about 11cubic meters.

3. The vessel of claim 1 having at least two axels attached to the bottom section and supporting the substantially rectangular body.

4. The vessel of claim 3 configured to contain about 2 to about 4 cubic meters per axel.

5. The vessel of claim 3 including 2 axels.

6. The vessel of claim 3 including 3 axels.

7. The vessel of claim 3 wherein the container body is removably attached to the axels through rails which allow the container body to slide or roll off the rails when desired after transport.

8. The vessel of claim 1 capable of holding up to about 20,000 kilograms of liquid containing unstabilized drill cuttings.

9. The vessel of claim 1 wherein the liquid containing unstabilized drill cuttings are oil based mud drill cuttings or water containing salt based drill cuttings.

10. The vessel of claim 1 wherein the axels are positioned so as to provide a substantially equal weight distribution of liquid containing unstabilized drill cuttings on each axel during transport.

11. Multiple vessels of claim 1 connected in series.

12. A method of transporting liquid containing unstabilized drill cuttings comprising filling the vessel of claim 1 with liquid containing unstabilized drill cuttings, transporting the filled vessel to a pre-determined dumping location, and unloading the liquid containing unstabilized drill cuttings from the vessel, without any leakage of liquid from the drill cuttings during transport.

13. The method of claim 12 comprising filling multiple vessels and transporting them in series.

14. The method of claim 12 wherein the cuttings contain about 20% to about 50% liquids by volume.

15. The method of claim 12 wherein the weight of the cuttings is about 10,000 kilograms to about 20,000 kilograms per transport vessel.

16. The method of claim 12 wherein the unstabilized drill cuttings are oil based mud drill cuttings or water containing salt based drill cuttings.

\* \* \* \* \*

UNITED STATES PATENT AND TRADEMARK OFFICE
CERTIFICATE OF CORRECTION

PATENT NO. : 10,035,406 B2
APPLICATION NO. : 15/014451
DATED : July 31, 2018
INVENTOR(S) : S. Ross et al.

Page 1 of 1

It is certified that error appears in the above-identified patent and that said Letters Patent is hereby corrected as shown below:

In the Claims

Column 10, Line 60 Claim 2, change "11cubic" to --11 cubic--

Signed and Sealed this
Twenty-sixth Day of February, 2019

Andrei Iancu
*Director of the United States Patent and Trademark Office*